United States Patent

Yates

[11] 4,081,054
[45] Mar. 28, 1978

[54] HYDRAULIC STEERING WITH FEEDBACK

[75] Inventor: Jan B. Yates, Reynoldsburg, Ohio

[73] Assignee: Caterpillar Tractor Co., Peoria, Ill.

[21] Appl. No.: 785,621

[22] Filed: Apr. 7, 1977

[51] Int. Cl.² ............................................. B62D 5/06
[52] U.S. Cl. ..................................... 180/139; 60/463;
137/45; 180/140
[58] Field of Search ............... 180/139, 134, 135, 136,
180/137, 141, 142, 143; 60/463; 137/45

[56] References Cited

U.S. PATENT DOCUMENTS

| | | | |
|---|---|---|---|
| 2,904,120 | 9/1959 | Bidwell | 180/141 |
| 3,326,317 | 6/1967 | Marquadt | 180/139 |
| 4,019,603 | 4/1977 | Unruh | 180/134 |

Primary Examiner—Joseph F. Peters, Jr.
Assistant Examiner—John A. Pekar
Attorney, Agent, or Firm—Phillips, Moore, Weissenberger, Lempoi & Majestic

[57] ABSTRACT

The invention is concerned with an improvement in a hydraulic steering system for an articulated vehicle of the type which comprises a main steering valve system which directs fluid introduced thereto from a fluid source to a steering motor system responsive to an output of a steering pump apparatus. The improvement comprises an articulation angle pump and an associated conduit system connecting the articulation angle pump parallel to the steering pump system to make the steering valve system responsive to a difference in flow between the steering pump system and the articulation angle pump. Alternately or additionally the improvement can comprise a hydraulic accelerometer and associated accelerometer conduit system in parallel to the steering pump system to make the steering valve system responsive to the output of the steering pump system plus a signal determined by the hydraulic accelerometer.

8 Claims, 2 Drawing Figures

HYDRAULIC STEERING WITH FEEDBACK

BACKGROUND OF THE INVENTION

1. Field of the Invention

The invention is related to hydraulic steering systems and more particularly to hydraulic steering systems for articulated vehicles. Still more particularly the invention is concerned with hydraulic steering systems which utilize feedback from an articulation angle responsive pump and/or a hydraulic accelerometer.

2. Prior Art

A number of steering systems include non-continuous mechanical elements such as worm gears and sector gears which require adjustment to assure complete travel for the steering system. Such systems do not generally have the capability of significantly modifying vehicle handling characteristics to achieve better handling thereof. A system which would provide complete travel and would allow for a modification of vehicle handling characteristics to achieve better handling would be an improvement over the present systems which have non-continuous mechanical elements.

The prior art also discloses steering systems which have a steering pump and a hydraulic follow up of one sort or another acting on a steering valve. The prior art further teaches the use of an electronic system for developing an understeer situation. Still further the prior art teaches the use of a fluidic accelerometer for developing a control signal related to vehicle acceleration.

Even taking into account all of the many teachings of the prior art, it is clear that the prior art does not teach a hydraulic steering system having a main steering valve that is responsive to a steering pump and a hydraulic accelerometer and in certain embodiments also to an articulation pump. Further, the prior art does not teach a system which has the continuation and smooth adjustment which would be available with a hydraulic steering system having a main steering valve that is responsive to a steering pump and a hydraulic accelerometer and in certain embodiments an articulated angle pump.

SUMMARY OF THE INVENTION

The present invention is directed to overcoming one or more of the problems as set forth above.

According to the present invention, an improvement is provided in a hydraulic steering system for an articulated vehicle which comprises main steering valve means which directs fluid introduced thereto from fluid source means to steering motor means responsive to an output of steering pump means. The improvement comprises articulation angle pump means and associated parallel connected articulation conduit means connecting the articulation angle pump means to the steering pump means to make the steering valve means responsive to a difference in flow between the steering pump means and the articulation angle pump means. As an alternate or additional improvement there is provided hydraulic accelerometer means and accelerometer conduit means in parallel to the steering pump means to make the steering valve means responsive to the output of the steering pump means plus a signal determined by the hydraulic accelerometer.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENTS

Figure 1:
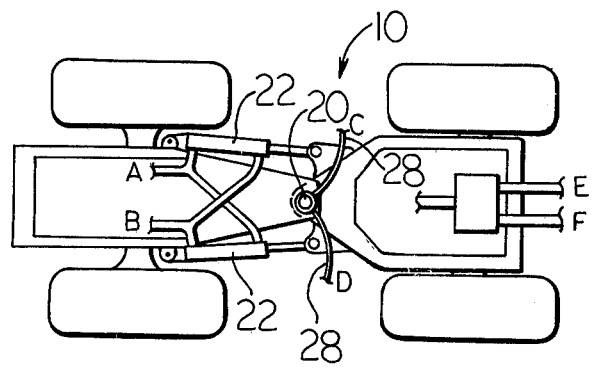
FIG. 1 illustrates diagrammatically an articulated vehicle in accordance with the present invention.
Figure 2:
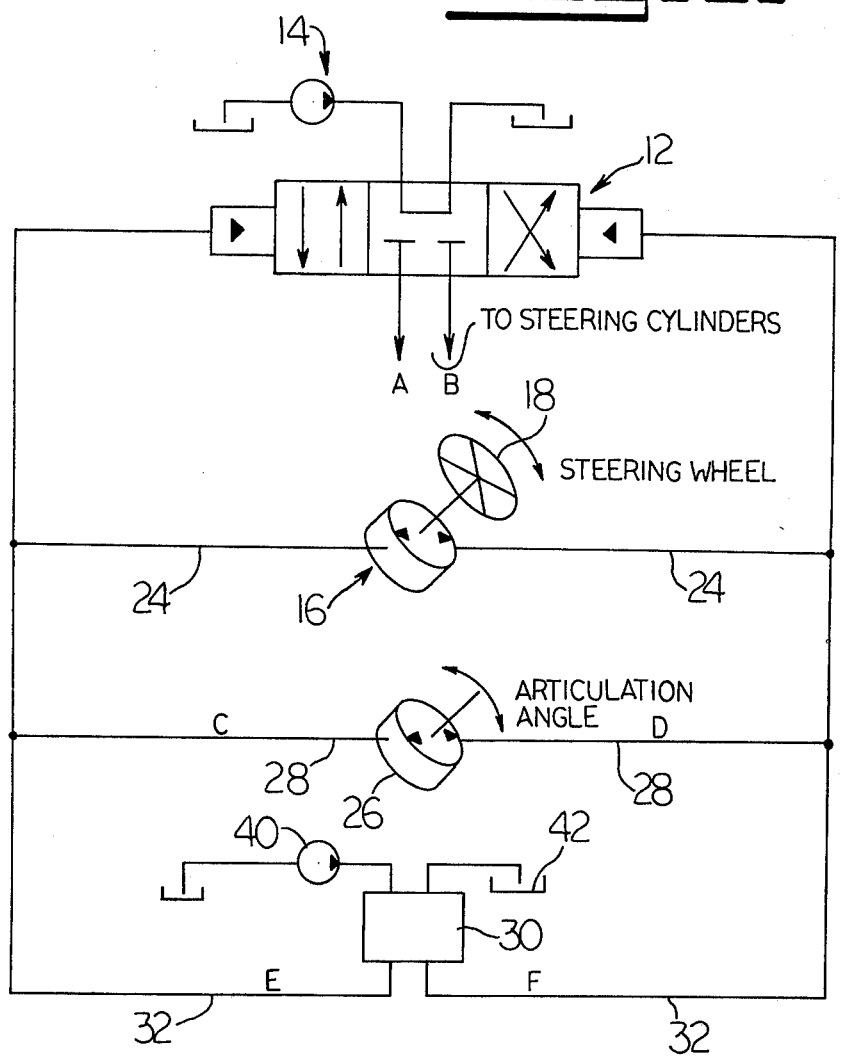
FIG. 2 illustrates schematically the control and feedback portions of a hydraulic steering system for an articulated vehicle.

Adverting first to FIGS. 1 and 2 there is illustrated an articulated vehicle 10 which comprises main steering valve means, in the embodiment illustrated a main steering valve 12 which directs fluid introduced thereto from fluid source means, in the embodiment illustrated a man pump 14, to steering motor means responsive to an output of steering pump means, in the embodiment illustrated a steering pump 16. The steering pump 16 pumps fluid responsive to movement of a steering wheel 18. It will be clear that the articulated vehicle 10 is articulatable about a joint 20 on contraction of one and expansion of another of a pair of hydraulic cylinders 22. The main steering valve 12 is shifted responsive to twisting of the steering wheel 18 which adjusts the output from the steering pump 16. Thus, fluid from the pump 14 carries flows either to or from one or more of the steering cylinders of the articulated vehicle 10. It will be noted that the steering pump 16 is connected via a pair of conduits 24 across the main steering valve 12.

In accordance with the present invention and particularly with one embodiment thereof, there is provided articulation angle pump means, in the embodiment illustrated an articulation angle responsive pump 26, connected in parallel to the steering pump 16 and across the main steering valve 12 via a pair of articulation conduits 28 shown in both FIGS. 1 and 2. As the articulated vehicle 10 moves about the joint 20 thus changing the articulation angle between the follower vehicle and the motivating vehicle, the articulation angle pump 26 varies its output whereby the main steering valve 12 is subjected to a difference in pressure between that developed by the steering pump 16 and the articulation angle pump 26.

In accordance with an alternate embodiment of the present invention hydraulic accelerometer means, in the embodiment illustrated a hydraulic accelerometer 30 is provided which is connected across the main steering valve 12 and parallel to the pair of steering pump conduits 24 via a pair of accelerometer conduits 32. In systems wherein an articulation angle pump 26 is not included the steering valve 12 is then responsive to the output of the steering pump 16 plus a signal determind by the hydraulic accelerometer 30. In systems wherein an articulation pump 26 is present the steering valve 12 becomes responsive to a difference in flow between the steering pump 16 and the articulation pump 26 plus a signal determined by the hydraulic accelerometer 30.

Figure 3:
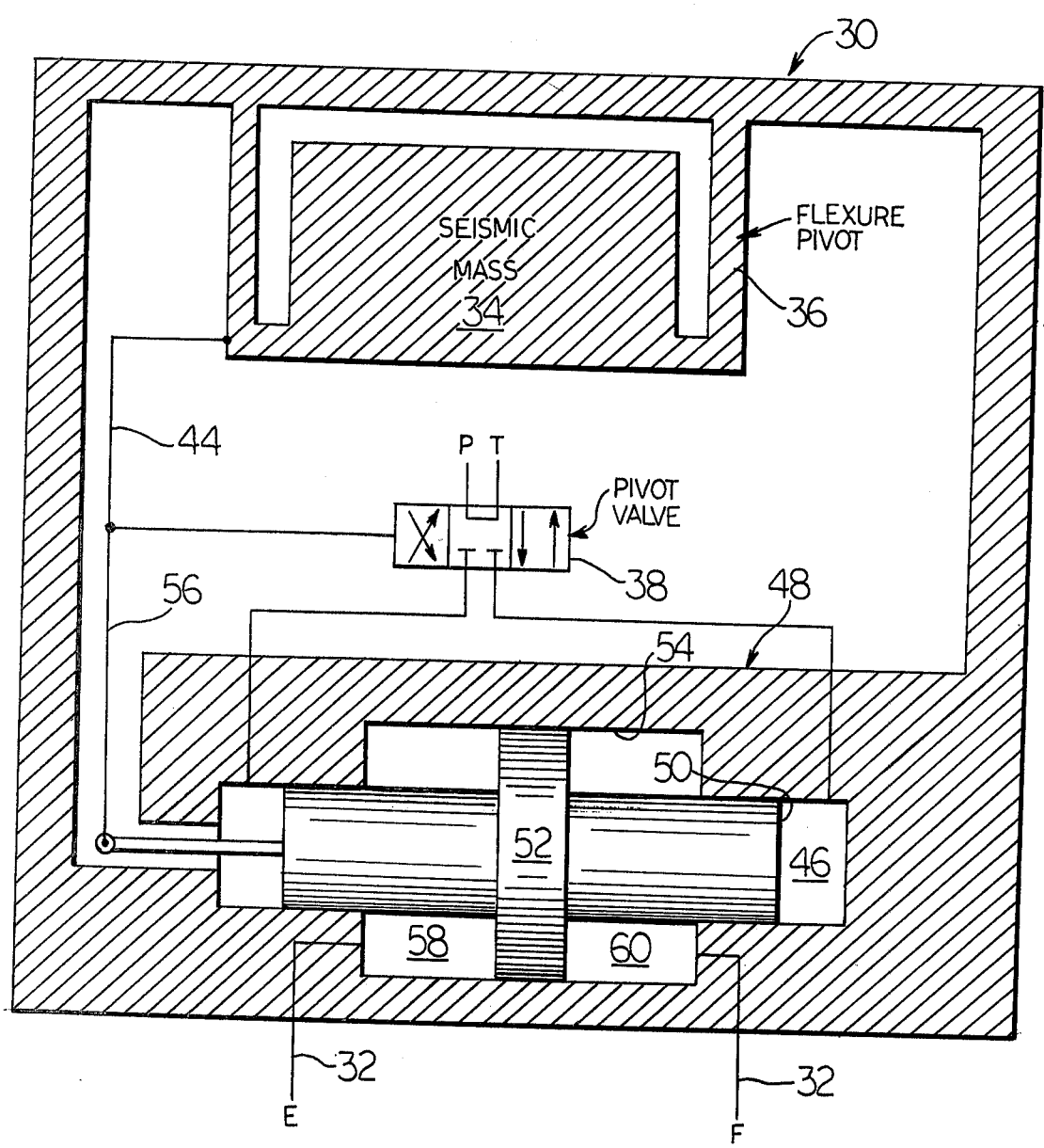
FIG. 3 illustrates, partially schematically and partially in section, a hydraulic accelerometer useful in the circuit of FIG. 2.

Whether or not an articulation angle pump 26 is present, the preferred structure for the hydraulic accelerometer 30 is illustrated in FIG. 3. The hydraulic accelerometer 30 comprises a seismic mass 34 disposed for example via a flexure pivot 36 for detection of lateral acceleration of the vehicle 10. The hydraulic accelerometer 30 preferably includes pilot valve means such as a pilot valve 38 which normally directs flow from a pilot pump 40 to a sump 42. The pilot valve 38 is generally physically connected as represented by a line 44 to be moved responsive to movements of the seismic mass 34. As the pilot valve 38 is moved, for example rightwardly, flow is directed from the pilot pump 40 to a righthandmost chamber 46 of a slave piston arrangement 48 wherein the fluid introduced into the righthandmost chamber 46 acts against a first end 50 of a slave piston 52 to force the slave piston to move leftwardly within a bore 54. As the slave piston 52 moves leftwardly it acts upon the pilot valve 38 in opposition to the motion produced thereon by movement of the seismic mass 34 and as represented by a line 56. This shifts the pilot valve 38 into its normally blocked position. Meanwhile, flow within the bore 54 in a lefthand chamber 58 formed therein is forced to flow via the accelerometer conduit 32 and hence to act upon the main steering valve 12. It is clear that if the pilot valve 38 is shifted rightwardly instead of leftwardly responsive to movement of the seismic mass 34 then flow would be forced from a righthand chamber 60 within the bore 54 and out via the accelerometer conduit 32 to act again upon the main steering valve 12. It is also clear that the movement of the slave piston 52 responsive to pressure from the pilot pump 40 leads to a shifting of the pilot valve 38 into a pilot flow blocking position, namely the position illustrated in FIG. 3.

There results from the improvements set out above an apparatus which yields continuous adjustment of hydraulic steering via hydraulic adjustment means along with feedback proportional to sideways acceleration of the vehicle and/or to the degree or angle of articulation of the vehicle.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a hydraulic steering system for an articulated vehicle which comprises main steering valve means which directs fluid introduced thereto from fluid source means to steering motor means responsive to an output of steering pump means, an improvement comprising:

articulation angle responsive pump means;
articulation conduit means connecting said articulation angle pump means in parallel to said steering pump means to make steering valve means responsive to a difference in flow between said steering pump means and said articulation angle pump means;
hydraulic accelerometer means for detecting lateral acceleration of the vehicle; and
accelerometer conduit means connecting said hydraulic accelerometer means in parallel to said steering pump means and said articulation pump means to make said steering valve means responsive to a difference in flow between said steering pump means and said articulation angle pump means plus a signal determined by said hydraulic acceleromater means.

2. An improvement as in claim 1, wherein said hydraulic accelerometer comprises seismic mass means disposed for detection of lateral acceleration.

3. An improvement as in claim 2, wherein said hydraulic accelerometer includes pilot valve means which shifts responsive to movement of said seismic mass and slave piston means moving responsive to movement of said pilot means to direct a fluid signal into said accelerometer conduit means.

4. An improvement as in claim 3, wherein movement of said slave piston responsive to pilot flow directed by said pilot valve means acts to shift said pilot valve means into a pilot flow blocking position.

5. In a hydraulic steering system for an articulated vehicle which comprises main steering valve means which directs fluid introduced thereto from fluid source means to steering motor means responsive to an output of steering pump means, an improvement comprising:

hydraulic accelerometer means for detecting lateral acceleration of the vehicle; and
accelerometer conduit means in parallel to said steering pump means to make said steering valve responsive to said output of said steering pump means plus a signal determined by said hydraulic accelerometer means.

6. An improvement as in claim 5, wherein said hydraulic accelerometer means comprises seismic mass means disposed for detection of lateral acceleration.

7. An improvement as in claim 6, wherein said hydraulic accelerometer means includes pilot valve means which shifts responsive to movement of said seismic mass and slave piston means moving responsive to movement of said pilot valve means to direct the fluid signal into said accelerometer conduit means.

8. An improvement as in claim 7, wherein movement of said slave piston responsive to pilot flow directed by said pilot valve means acts to shift said pilot valve means into a pilot flow blocking position.

* * * * *